United States Patent
Kim et al.

(10) Patent No.: US 10,519,308 B2
(45) Date of Patent: Dec. 31, 2019

(54) COMPOSITION FOR GEL CUSHION, AND GEL CUSHION MANUFACTURED THEREFROM

(71) Applicants: BULLSONE CO., LTD., Seoul (KR); CAREMATE CORPORATION, Ansan-si (KR)

(72) Inventors: Young-Jin Kim, Incheon (KR); Byoung-Jun Seo, Incheon (KR); He-Goun Yoon, Seoul (KR)

(73) Assignees: Bullstone Co., Ltd., Seoul (KR); Caremate Corporation, Ansan-si (KR)

( * ) Notice: Subject to any disclaimer, the term of this patent is extended or adjusted under 35 U.S.C. 154(b) by 3 days.

(21) Appl. No.: 15/533,270

(22) PCT Filed: Jul. 28, 2015

(86) PCT No.: PCT/KR2015/007884
§ 371 (c)(1),
(2) Date: Jun. 5, 2017

(87) PCT Pub. No.: WO2016/088979
PCT Pub. Date: Jun. 9, 2016

(65) Prior Publication Data
US 2018/0009977 A1    Jan. 11, 2018

(30) Foreign Application Priority Data

Dec. 5, 2014 (KR) ........................ 10-2014-0174278

(51) Int. Cl.
*C08L 53/02* (2006.01)
*B68G 5/00* (2006.01)
*C08L 91/00* (2006.01)

(52) U.S. Cl.
CPC ............... *C08L 53/02* (2013.01); *B68G 5/00* (2013.01); *C08L 91/00* (2013.01); *C08L 2201/08* (2013.01); *C08L 2201/56* (2013.01)

(58) Field of Classification Search
CPC ....................................... C08L 53/02
See application file for complete search history.

(56) References Cited

U.S. PATENT DOCUMENTS

| | | | | |
|---|---|---|---|---|
| 5,910,530 A | * | 6/1999 | Wang | C08F 8/32 524/534 |
| 2007/0197949 A1 | * | 8/2007 | Chen | C08L 53/02 602/41 |

FOREIGN PATENT DOCUMENTS

| | | |
|---|---|---|
| EP | 0 463 497 A1 | 1/1992 |
| EP | 0 879 832 A1 | 11/1998 |

(Continued)

OTHER PUBLICATIONS

International Search Report dated Nov. 9, 2015 in counterpart International Patent Application No. PCT/KR2015/007884 (2 pages, in English).

(Continued)

*Primary Examiner* — Arrie L Reuther
(74) *Attorney, Agent, or Firm* — NSIP Law

(57) ABSTRACT

The present invention relates to a composition for a gel cushion and to a gel cushion manufactured therefrom, the composition for a gel cushion comprising 5-8 parts by weight of an additive based on 100 parts by weight of a mixture of an oil and a copolymer which is obtained by polymerization of a polystyrene-based polymer and polypropylene.

5 Claims, 10 Drawing Sheets

(56) References Cited

FOREIGN PATENT DOCUMENTS

| | | |
|---|---|---|
| JP | 2009-24181 A | 2/2009 |
| KR | 20-0293293 Y1 | 10/2002 |
| KR | 10-0553222 B1 | 2/2006 |
| WO | WO 02/14424 A2 | 2/2002 |
| WO | WO 2011/114990 A1 | 9/2011 |

OTHER PUBLICATIONS

Extended European Search Report dated Jul. 25, 2018, in corresponding European Application No. 15866253.6 (7 pages, in English).

* cited by examiner

COMPOSITION FOR GEL CUSHION, AND GEL CUSHION MANUFACTURED THEREFROM

CROSS-REFERENCE TO RELATED APPLICATIONS

This application is a U.S. National Stage Application of International Application No. PCT/KR2015/007884, filed on Jul. 28, 2015, which claims the benefit under 35 USC 119(a) and 365(b) of Korean Patent Application No. 10-2014-0174278, filed on Dec. 5, 2014, in the Korean Intellectual Property Office.

TECHNICAL FIELD

The present invention relates to a composition for a gel cushion and a gel cushion manufactured therefrom, and more particularly, to a composition for a gel cushion with which it is possible to lower the cost of a composition, to prevent a pellet from sticking when a raw material is stored, to cause no oil blooming, to generate no internal burrs and external burrs, and to exhibit excellent thermal resistance, and a gel cushion manufactured therefrom.

BACKGROUND ART

Generally, a cushion used for a bed, a sitting mat or the like requires comfort that a user feels in addition to the ability to support and thus maintain human body weight. To be a cushion that meets these requirements, a cushion should have properties such as appropriate softness and compressibility, vibration absorbability, a dehumidification property, deformation followability, durability and the like. For this purpose, conventionally, cotton or synthetic fiber cloth (web), synthetic resin foam such as polyurethane foam or the like, sponge rubber, a semi-hard material or a gel-like material has been used without change or in combination.

Among these, a gel cushion manufactured using a gel-like material has excellent body pressure dispersibility, ventilation, durability and hygienic safety and the like, and thus is becoming more common.

However, a conventional gel cushion has problems in which the cost of a composition used to manufacture a gel cushion is very high, a pellet sticks when a raw material is stored, an oil oozes due to oil blooming when it is used, and an internal burr and an external burr are caused upon injection.

In addition, when a gel cushion manufactured using a conventional composition for a gel cushion is used for a vehicle, there is an advantage of minimizing vibration and impact due to a high buffering force, but thermal resistance is degraded. That is, when the car door is kept closed for a long time in a hot summer or when the heating sheet is left on for a long time in winter, a gel cushion becomes soft. In this state, when a user sits or places a heavy object for a long time, a shape of a gel cushion is deformed, and is not restored to an original shape thereof.

DISCLOSURE

Technical Problem

The present invention is designed to solve the above problems and directed to providing a composition for a gel cushion with which it is possible to lower the cost of a composition, to prevent a pellet from sticking when a raw material is stored, to cause no oil blooming, to generate no internal burrs and external burrs, and to exhibit excellent thermal resistance, and a gel cushion manufactured therefrom.

The above and other objects and advantages of the present invention will become more apparent from the following description of an exemplary embodiment.

Technical Solution

According to an embodiment of the present invention, there is provided a composition for a gel cushion which includes 5 to 8 parts by weight of an additive with respect to 100 parts by weight of a mixture composed of an oil and a copolymer prepared by copolymerizing a polystyrene-based polymer and polypropylene.

Here, the polystyrene-based polymer may have a triblock structure, and may be a styrene-(ethylene/butylene)-styrene (SEBS) block copolymer or polystyrene-block-poly(ethylene-ethylene/propylene)-block-polystyrene (SEEPS).

Preferably, the mixture includes 30 to 40 wt % of the copolymer prepared by copolymerizing a polystyrene-based polymer and polypropylene and 60 to 70 wt % of the oil.

Preferably, the additive is dry silica or wet silica.

Preferably, the dry silica is fumed silica.

Preferably, the composition for a gel cushion has a hardness (Shore A) of 10 or less.

Preferably, the composition for a gel cushion further includes 0.3 to 0.7 parts by weight of a heat stabilizer with respect to 100 parts by weight of the mixture composed of the copolymer and the oil.

According to another embodiment of the present invention, there is provided a gel cushion manufactured using the above-described composition for a gel cushion.

Advantageous Effects

According to the present invention, it is possible to lower the cost of a composition, to prevent a pellet from sticking when a raw material is stored, to cause no oil blooming, to generate no internal burrs and external burrs, and to exhibit excellent thermal resistance.

MODES OF THE INVENTION

Figure 1:
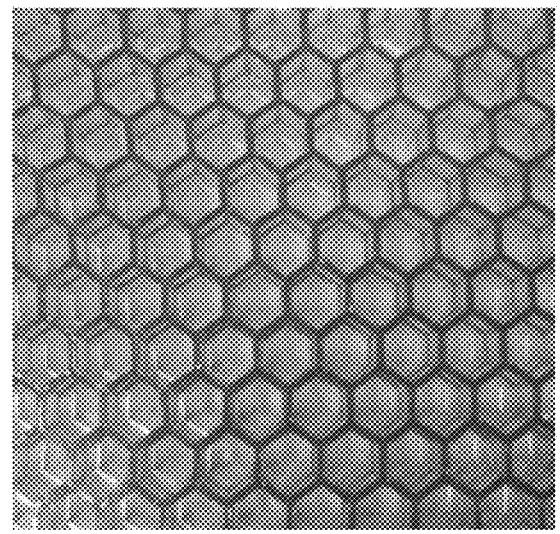
FIG. 1 is an image substituting for a plan view of a gel cushion manufactured using a composition for a gel cushion according to an embodiment of the present invention.

Hereinafter, the present invention will be described in detail with reference to embodiments and drawings of the present invention. It should be understood by those skilled in the art that these embodiments are only exemplary for describing the present invention in more detail, and the present invention is not limited to the embodiments.

A composition for a gel cushion according to an embodiment of the present invention includes 5 to 8 parts by weight of an additive with respect to 100 parts by weight of a mixture composed of an oil and a copolymer prepared by copolymerizing a polystyrene-based polymer and polypropylene.

The polystyrene-based polymer has a triblock structure, and may be a styrene-(ethylene/butylene)-styrene (SEBS) block copolymer or polystyrene-block-poly(ethylene-ethylene/propylene)-block-polystyrene (SEEPS). In the specification, PP-SEBS, which is a copolymer prepared by copolymerizing SEBS as the polystyrene-based polymer and polypropylene, is described as an example, but the present invention is not limited thereto.

The mixture composed of an oil and a copolymer prepared by copolymerizing a polystyrene-based polymer and polypropylene preferably includes 30 to 40 wt % of the copolymer prepared by copolymerizing a polystyrene-based polymer and polypropylene and 60 to 70 wt % of the oil.

When a content of the oil is less than 60 wt %, hardness (Shore A) is increased and thus an effect of dispersing body pressure is decreased and a contraction rate is so high that ejecting is very difficult upon injection. On the other hand, when a content thereof is greater than 70 wt %, an oil and a copolymer are not easily mixed so that injection is not possible, and, even when injection is progressed, oil blooming is caused when it is used. For this reason, it is preferable that a content of the oil be within the above range.

In addition, 5 to 8 parts by weight of an additive is preferably included with respect to 100 parts by weight of the mixture composed of the copolymer and the oil. When a content of the additive is less than 5 parts by weight, an oil and a copolymer are not mixed and thus properties may be degraded. On the other hand, when a content thereof is greater than 8 parts by weight, hardness is increased. For this reason, it is preferable that a content of the additive be within the above range.

The additive is used to eliminate oil blooming and improve thermal resistance of a gel cushion, and dry silica or wet silica may be used. As dry silica, fumed silica is most preferably used.

In addition, the composition for a gel cushion according to an embodiment of the present invention may further include a heat stabilizer, as necessary, in order to prevent degradation caused by heating upon molding. In this case, 0.3 to 0.7 parts by weight of a heat stabilizer is preferably included with respect to 100 parts by weight of the mixture composed of the copolymer and the oil. As such a heat stabilizer, a heat stabilizer generally used in the art may be used without specific limitation, and may be organic phosphites such as triphenyl phosphite, tris-(2,6-dimethylphenyl) phosphite, tris-(mixed mono- and di-nonylphenyl)phosphite; phosphonates such as dimethyl benzene phosphonate; phosphates such as trimethyl phosphate; or a combination including at least one of the above-described heat stabilizers.

In addition, the composition for a gel cushion according to an embodiment of the present invention preferably has a hardness (Shore A) of 10 or less to meet performance of the gel cushion.

An optimum composition ratio according to hardness of the composition for a gel cushion according to an embodiment of the present invention is shown in the Table 1.

TABLE 1

| Hardness (Shore A) | 0 | 5 | 10 |
|---|---|---|---|
| PP-SEBS copolymer | 30 to 31 wt % | 35 wt % | 40 wt % |
| White oil | 69 to 70 wt % | 65 wt % | 60 wt % |
| Fumed silica | 7.5 to 8 pph | 6.5 pph | 5 pph |
| Heat stabilizer (antioxidant) | 0.7 pph | 0.5 pph | 0.3 pph |

* pph: Parts Per Hundred

A method of preparing the composition for a gel cushion consists of mixing an additive and a copolymer prepared by copolymerizing a polystyrene-based polymer and polypropylene (step 1), stirring the mixture prepared in step 1 and dropping an oil thereinto (step 2), and stirring the mixture prepared in step 2 using a mixer at an ultrahigh speed for 10 to 20 minutes to prepare a composition for a gel cushion (step 3). The composition for a gel cushion thus prepared is injected to manufacture a gel cushion.

More specifically, in step 1, an additive and a copolymer prepared by copolymerizing a polystyrene-based polymer and polypropylene are mixed, and an additive is mixed to eliminate oil blooming of a gel cushion. In step 2, the mixture prepared in step 1 is stirred and an oil is dropped thereinto for slightly adding an oil to mix an oil well. In step 3, the mixture into which an oil is dropped is stirred using a mixer at an ultrahigh speed for 10 to 20 minutes to prepare a composition for a gel cushion which is a gel-like raw material.

In step 3, the stirring is preferably performed in a bath at 40 to 50° C. at a speed of 5,000 to 6,000 rpm.

The composition for a gel cushion thus prepared is injected to manufacture a final product, a gel cushion. In this case, it is preferable that an injecting pressure be 15 kg/cm$^2$ and a nozzle temperature be 250° C.

Hereinafter, a configuration of the present invention and effects according thereto will be described in more detail with reference to an example and comparative example. However, the example is for specifically describing the present invention in more detail, and the scope of the present invention is not limited to the example.

Example 14.3 parts by weight of fumed silica with respect to 100 parts by weight of PP-SEBS were mixed, 186 parts by weight of an oil (white oil) was added dropwise with stirring, and then the resulting mixture was stirred in a bath at 45° C. using a mixer at an ultrahigh speed of 5,200 rpm for 14 minutes to prepare a gel-like raw material. In this case, the hardness of a composition for a gel cushion was 5 Shore A (an optimum composition ratio according to hardness of 5 in Table 1). Afterward, a composition for a gel cushion which is the gel-like raw material was injected at an injecting pressure of 15 kg/cm$^2$ and a nozzle temperature of 250° C. to manufacture a gel cushion.

Comparative Example 186 parts by weight of an oil (white oil) with respect to 100 parts by weight of PP-SEBS were mixed with stirring to prepare a composition for a gel cushion, which was then prepared in a pellet form through extruding and pelletizing processes. Afterward, a raw material in a pellet form was injected at an injecting pressure of 15 kg/cm$^2$ and a nozzle temperature of 250° C. to manufacture a gel cushion.

Gel cushions according to Example and Comparative Example were used to identify properties thereof as in the following Experimental Example. The results are shown in FIGS. 1 to 10.

Experimental Example

An oil blooming test according to an addition amount of fumed silica was performed. A cushion was covered with a cover, a weight of 10 kg was put thereon at 70° C., and then the cushion was left for 30 minutes.

Figure 2:
FIG. 2 is an image substituting for a partially perspective view of a gel cushion manufactured using a composition for a gel cushion according to an embodiment of the present invention.
Figure 3:
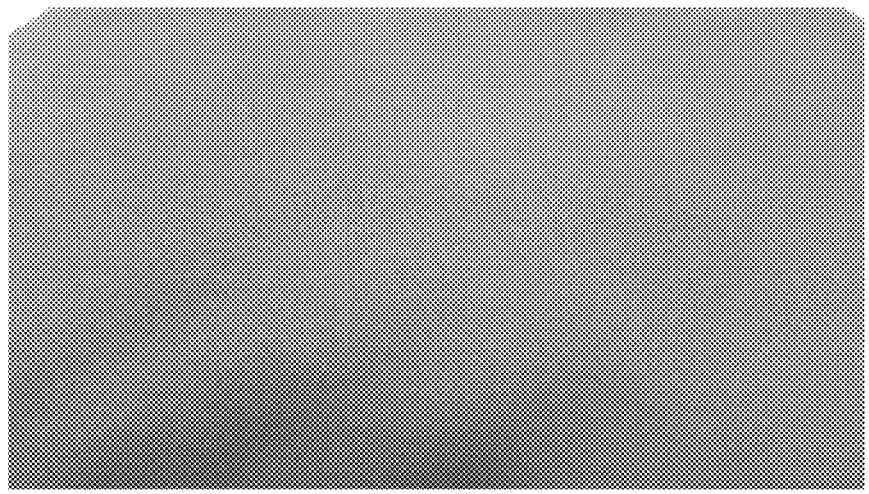
FIG. 3 is an image after an oil blooming test for a gel cushion manufactured using a composition for a gel cushion according to an embodiment of the present invention.
Figure 4:
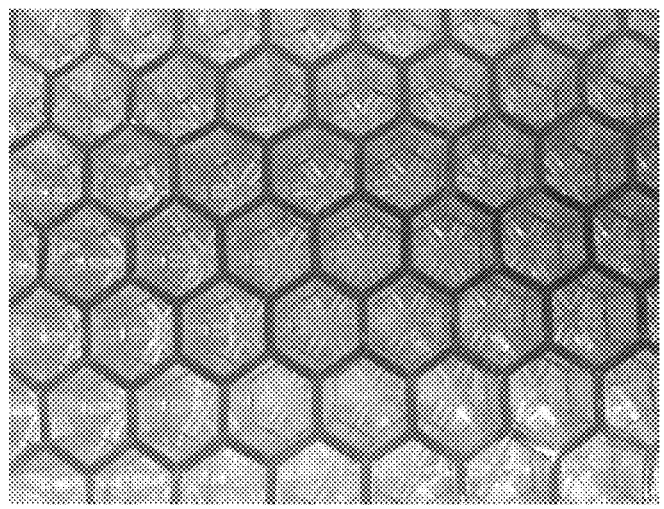
FIG. 4 is an image illustrating the inside of a gel cushion manufactured using a composition for a gel cushion according to an embodiment of the present invention.

Based on FIGS. 1, 2 and 4 illustrating an image substituting for a plan view of the gel cushion manufactured using the composition for a gel cushion according to an example of the present invention, an image substituting for a partially perspective view thereof and an image of the inside thereof, respectively, it was confirmed that the gel cushion according to Example exhibited no internal burrs and external burrs and had thermal resistance. In addition, based on FIG. 3 illustrating an image after an oil blooming test for the gel cushion manufactured using the composition for a gel cushion according to an example of the present invention, it was confirmed that the gel cushion did not exhibit oil blooming at all.

Figure 5:
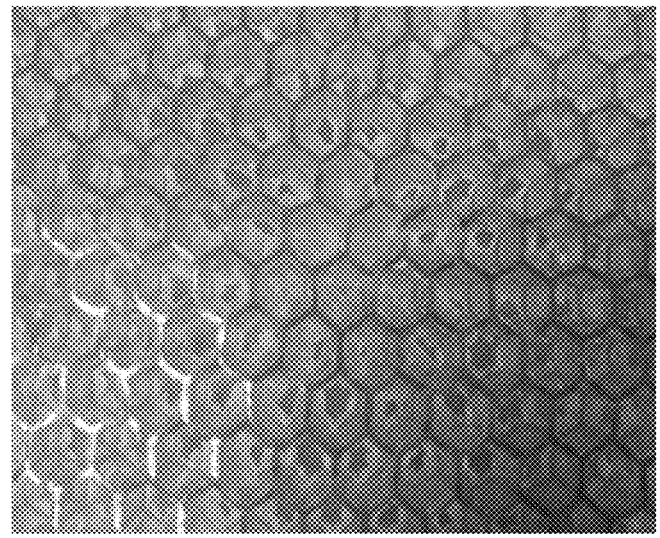
FIG. 5 is an image substituting for a plan view of a conventional gel cushion.
Figure 6:
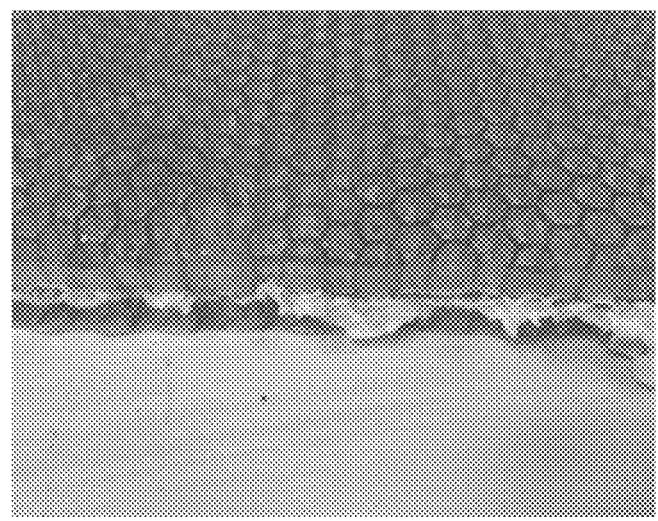
FIG. 6 is an image substituting for a partially perspective view of a conventional gel cushion.
Figure 7:
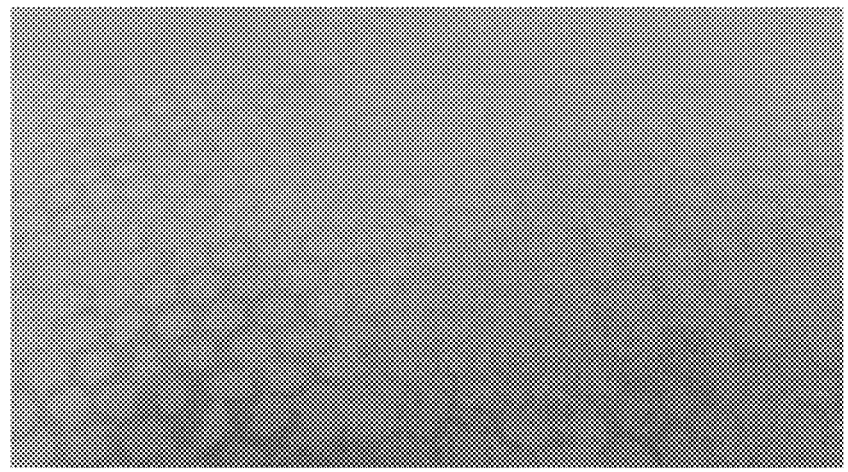
FIG. 7 is an image after an oil blooming test for a conventional gel cushion.
Figure 8:
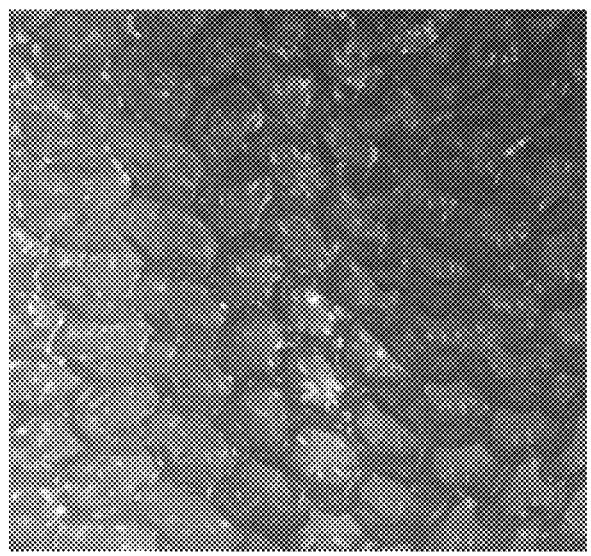
FIG. 8 is an image illustrating the inside of a conventional gel cushion.
Figure 9:
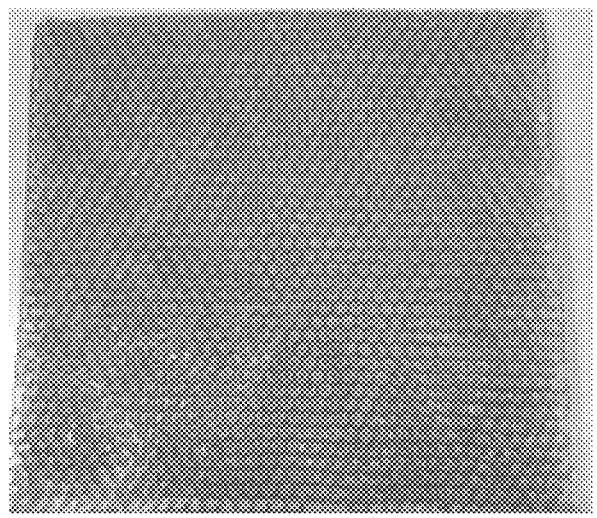
FIG. 9 is an image illustrating that gas is generated from a conventional gel cushion upon injection.
Figure 10:
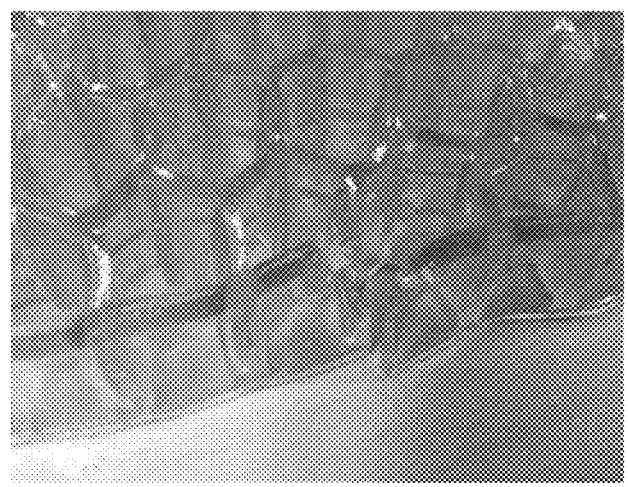
FIG. 10 is an image illustrating that a cushion is crushed due to degradation of properties of a conventional gel cushion.

Meanwhile, based on FIGS. 5, 6 and 8 illustrating an image substituting for a plan view of a conventional gel cushion, an image substituting for a partially perspective view thereof and an image of the inside thereof, respectively, it was confirmed that the gel cushion according to Comparative Example exhibited both internal burrs and external burrs and did not have thermal resistance. In addition, based on FIG. 7 illustrating an image after an oil blooming test for the conventional gel cushion, it was confirmed that the gel cushion according to Comparative Example exhibited oil blooming. Additionally, based on FIG. 9 (the white part in the image represents an internal bubble caused by gas), it can be seen that gas was generated from the conventional gel cushion according to Comparative Example upon injection, and, based on FIG. 10, it was confirmed that a cushion was crushed due to degradation of properties.

Therefore, the composition for a gel cushion and the gel cushion manufactured therefrom according to the present invention has technological effects such as it is possible to prevent a pellet from sticking when a raw material is stored, to cause no oil blooming, to generate no internal burrs and external burrs, and to exhibit excellent thermal resistance.

In the specification, only a few examples of various examples conducted by the present inventors have been described, but the technological scope of the present invention is not limited thereto. It is clear to those skilled in the art that various modifications can be made.

The invention claimed is:

1. A composition for a gel cushion comprising:
    5 to 8 parts by weight of an additive based on 100 parts by weight of a mixture comprising 30 to 40 wt % of a copolymer prepared by copolymerizing a polystyrene-based polymer and polypropylene and 60 to 70 wt % of an oil; and
    0.3 to 0.7 parts by weight of a heat stabilizer based on 100 parts by weight of the mixture composed of the copolymer and the oil,
    wherein the heat stabilizer comprises at least one of phosphonates and phosphates, and the composition for a gel cushion has a hardness (Shore A) of 10 or less.

2. The composition according to claim 1, wherein the polystyrene-based polymer has a triblock structure, and is a styrene-(ethylene/butylene)-styrene (SEBS) block copolymer or polystyrene-block-poly(ethylene-ethylene/propylene)-block-polystyrene (SEEPS).

3. The composition according to claim 1, wherein the additive is dry silica or wet silica.

4. The composition according to claim 3, wherein the dry silica is fumed silica.

5. A gel cushion manufactured using the composition for a gel cushion according to any one of claims 1, 2, 3, and 4.

* * * * *